United States Patent Office 2,815,362
Patented Dec. 3, 1957

2,815,362

PROCESSES FOR MAKING TRANS CHRYSANTHEMIC ACID AND RELATED COMPOUNDS AND PRODUCTS THEREFROM

Stanley H. Harper, Mount Pleasant, Salisbury, Southern Rhodesia, assignor to Benzol Products Company, Newark, N. J., a corporation of New Jersey No Drawing. Application January 3, 1956,
Serial No. 556,785

10 Claims. (Cl. 260—464)

This invention relates to processes for making trans-chrysanthemic acid, and to related compounds including intermediates as described herein below.

Processes are known for the production of a mixture of cis- and trans-(d,l) chrysanthemum carboxylic acid as described by Harper, Reed and Thompson, J. Sci. Food Agr. 2, 94–98 (1951).

The synthetic mixture obtained by the known processes consists of approximately 70% of such trans- and 30% of such cis- acid. The diastereomeric chrysanthemum carboxylic acids when esterified with substituted pentenolones form valuable insecticides, the esters made with the trans acid being considerably more toxic to insects than those made with the cis acid.

It is obvious that the formation of the cis acid is a drawback because in the esterification of the mixture of the two acids the cis acid uses up a substantial portion of the expensive alcoholic component. On the other hand if the cis acid is separated from the trans acid before esterification the cis acid is wasted because up to this time no process was known by which cis chrysanthemum carboxylic acid could be transformed into trans acid.

Although from the foregoing it would be very desirable to prepare trans-chrysanthemum carboxylic acid free from the cis form, this has so far not been possible and attempts to change cis acid into trans acid have also been unsuccessful.

The principal object of the invention accordingly is to provide a simple, efficient process for the preparation of a substantially pure trans-chrysanthemic acid from cis compounds.

Another object of the invention is to provide a process for the production of intermediates for producing such trans acid and also to provide such intermediates in suitable form for processing.

The invention accordingly comprises the novel products as well as the novel processes and steps of processes according to which such products are manufactured, the specific embodiments of which are described hereinafter by way of example and in accordance with which I now prefer to practice the invention.

In accordance with my invention, I heat either cis-chrysanthemamide or cis-chrysanthemonitrile with an alkaline hydroxy compound in a liquid medium to produce either the trans-chrysanthemamide or the trans-chrysanthemic acid. The alkalis which I prefer to use are potassium hydroxide or sodium hydroxide in an aqueous or alcoholic solution. I prefer to use ethanol but other alcohols such as ethylene glycol may be employed. I prefer to use concentrations of 5 to 25% of the alkali in the solvents mentioned. The temperatures which I employ are from 75 to 170° C. and the periods of reaction are preferably from 5 to 24 hours. I have found in accordance with my invention when temperatures in the lower part of the temperature range are employed with the lower part of the time range, amides usually predominate. In the higher range of temperature and time mostly the acid is formed.

The trans-amide formed by my process may be isolated, for example by extraction with an organic solvent followed by evaporation of the solvent, or the amide or nitrile may be hydrolyzed to the trans-chrysanthemic acid, for example by continuing the action of the alkali on the trans-amide formed.

The expression "trans-chrysanthemic acid" is intended to designate trans-chrysanthemum carboxylic acid.

The esters of various pentenolones with trans-chrysanthemic acid and mixtures of cis- and trans-chrysanthemic acid are valuable insecticides. Those esters with:

R=—CH₂—CH=CH—CH₃
Cinerin 1
—CH₂—CH=CH₂
Allethrin
—CH₂—CH=CH—CH=CH₂
Pyrethrin 1

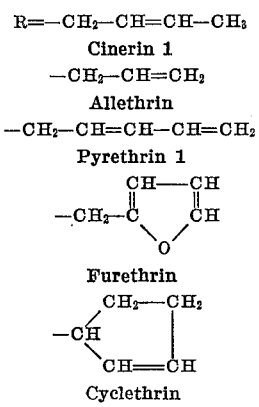

Furethrin

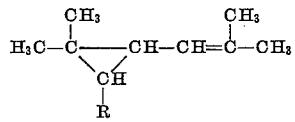

Cyclethrin form valuable compounds with the acid and mixtures mentioned. J. Econ. Etomology, vol. 42, p. 532; vol. 46, p. 999; vol. 455, p. 849; Soap & Chem Spec., Feb. 1955, p. 141.

Chrysanthemum carboxylic acid has the following constitution:

$$H_3C-C\begin{smallmatrix}CH_3\\|\\\end{smallmatrix}-CH-CH=C\begin{smallmatrix}CH_3\\|\\\end{smallmatrix}-CH_3$$
$$\underset{R}{\overset{CH}{|}}$$

where R is COOH. Where R is CN, the formula is for the nitrile. Where R is CONH₂, the formula represents the amide. The compounds can occur in four optically active forms: d-cis, d-trans, l-cis, l-trans.

The esters mentioned above of either d,trans-chrysanthemic acid or 1,trans-chrysanthemic acid or the racemate (d,1)-trans chrysanthemic acid are all useful as insecticides. Of these trans compounds mentioned, the racemate I now regard as the most important one commercially.

The following are examples of the way in which I now propose to practice my process in accordance with my invention. These examples are illustrative and the invention is not to be considered as limited thereto except as indicated in the appended claims.

EXAMPLES

(1) D-cis-chrysanthemamide may be prepared by treating the known d-cis-chrysanthemic acid with thionyl chloride to form the corresponding acid chloride in the normal manner. 8.5 grams of the chloride was added to excess aqueous ammonia at room temperature. Next day the oily crystals were collected (5.7 grams; 67% as amide) and twice crystallized from light petroleum (B. P. 60–80°) to give (+)-cis-chrysanthemamide (4.6 grams), M. P. 84.0°, as fine needles felting together (alpha)$_D^{18}$, angle of rotation of polarized light, + 78.2° (c, 1.102), + 77.5 (c, 1.135) (Found: C, 71.5; H, 10.0. C₁₀H₁₇ON requires C, 71.8; H, 10.2%). Evaporation of the light petroleum filtrates and distillation gave ((+)-cis-)chrysanthemonitrile (0.37 grams), B. P. 99–102°/11 mm., $n_D^{20}$ 1.4680, (alpha)$_D^{18.5}$+85.8° (c, 1.329), followed by the amide, B. P. 123°/0.4 mm. The infra-red spectrum of this nitrile showed it to be the cis-isomer uncontaminated by the trans-isomer.

D-cis-chrysanthemamide prepared as above (0.30 grams) was refluxed during 18 hours in 1.8 ml. 2N-potassium hydroxide (about .23 grams KOH) in 95% ethanol. The crystalline chrysanthemamide (0.21 grams) had (alpha)$_D^{14}$+34.7°, i. e. ca. 45% 1-transchrysanthemamide and 55 d-cis-chrysanthemamide. Crystallization from a light petroleum at room temperature gave 1-trans-chrysanthemamide. Keeing the filtrate at −5° then gave pure d-cis-chrysanthemamide. Approximately 45% of the d-cis-chrysanthemamide has been transformed into the 1-trans-chrysanthemamide in accordance with the above.

(2) Into a one gallon stainless steel autoclave were charged 77 grams crude (d,1)-cis-chrysanthemamide, prepared in accordance with Jour. Chem. Soc. 1945, p. 283 (At 285) Campbell & Harper, 38.5 grams caustic soda flakes and 480 milliliters water. The agitator was set in motion, and steam admitted to the jacket. The temperature was raised to 150 to 157° C. and kept there for five hours. The pressure rose gradually to 90 p. s. i.

The steam was shut off and the autoclave allowed to cool down overnight. The solution was filtered from some dirt, acidified with hydrochloric acid and extracted twice with benzene. The benzene was distilled off and the residue let crystallize. Crude (d,1)-trans-chrysanthemic acid recovered: 74 grams=96% of theory M. P. 46–62°. On recrystallization from pentane pure (d,1)-trans-chrysanthemic acid is obtained of M. P. 52–53°.

(3) A mixture of (d,1)-cis and (d,1)-trans chrysanthemonitrile may be prepared as follows:

*Hydrolysis of methyleneaminoacetonitrile.*—Portions (0.681 grams) of methyleneaminoacetonitrile, a known compound, were dissolved in 2N-hydrochloric acid (5 ml.) maintained at 50±2°. After suitable times of hydrolysis the solution was diluted to 100 ml. and the liberated formaldehyde estimated in 10-ml. aliquots by Romijn's procedure.

The following results were obtained:

| Time, minutes | 15 | 30 | 45 |
|---|---|---|---|
| Formaldehyde liberated, as percentage yield | 88 | 98 | 98 |

The diazoacetonitrile, distilled in nitrogen, had B. P. 35°/6 mm., 43°/10 mm.

*Addition of diazoacetonitrile to 2:5-dimethylhexa-2:4-diene.*—Diazoacetonitrile (8.0 grams, 1.0 mol.) in methylene chloride (20 ml.) was added slowly to 2:5-dimethylhexa-2:4-diene (17.0 grams, 1.3 mol.) containing copper bronze (0.2 grams) at room temperature. Evolution of gas ceased before all the diazoacetonitrile had decomposed, as was shown by the persistence of the yellow colour and the yellow distillate obtained when a portion of the solvent was distilled off under vacuum. Addition of further copper bronze and warming to 30° restarted the reaction. When all the diazoacetonitrile had decomposed, filtration and distillation gave the adduct chrysanthemonitrile (7.6 grams, 43%), B. P. 89–95°/7 mm. $n_D^{20}$ 1.469–1.470. On redistillation the middle portion which is a mixture of ca. 27% (d,1)-cis and ca. 73% (d,1)-trans chrysanthemonitrile, had B. P. 105°/16 mm. $n_D^{20}$ 1.4699 (Found: C, 80.1; H, 9.8; N, 9.3. $C_{10}H_{15}N$ requires C, 80.5; H, 10.1; N, 9.4%).

The above mixture of (d,1)-cis and (d,1)-trans chrysanthemonitrile (3.0 grams) and potassium hydroxide (3.4 grams) were refluxed in ethanol (15 ml.) during 9 hours and then the ethanol was distilled off. Addition of water to the residue precipitated a crystalline solid which was dissolved in ether. The ethereal extract was washed, dried (Mg SO$_4$) and evaporated and the residue (2.4 grams) crystallized once from light petroleum to give (d,1)-trans chrysanthemamide (1.2 grams). Evaporation of the filtrate and distillation gave unhydrolyzed nitrile (0.8 grams) and a residue of further (d,1)-trans chrysanthemamide (0.4 grams). The yield equals approximately 65% of theory. The remaining 35% is probably (d,1)-trans-chrysanthemic acid not recovered under conditions of the example.

(4) A mixture of (d,1)-cis and trans chrysanthemonitrile (3 grams) and potassium hydroxide (3.4 grams) with ethylene glycol (15 ml.) were refluxed at the boil for 24 hours and the product was then poured into water. Acidification with sulphuric acid gave (d,1)-trans-chrysanthemic acid (2.8 grams) crude acid, M. P. 40–46°, which on one low temperature crystallization from ethyl acetate gave pure (d,1)-trans-chrysanthemic acid having a M. P. of 53°. The yeild is 86% (d,1)-trans chrysanthemic acid.

(5) (d,1)-cis-Chrysanthemamide (1.0 grams) and sodium hydroxide (0.5 grams) were refluxed in ethylene glycol (5 ml.) until evolution of ammonia was just complete (4¾ hours). After dilution with water, extraction with ether, drying and evaporation, a negligible neutral fraction was obtained, and an acidic fraction (0.75 grams) containing the (d,1)-trans-chrysanthemic acid, which was distilled, B. P. 136–138°/8 mm. On recrystallization, (d,1)-trans chrysanthemic acid was obtained.

The crude cis compounds mentioned in the above examples can be used either in such crude form or purified as desired.

The expressions (+) or (−) are sometimes used herein preceding a compound to designate the symbols "d" and "l," respectively, which as well known, stand for dextro and laevo in referring to the direction of rotation of polarized light passing through a solution of a compound so designated; "C" is the concentration (percent $^w/_v$) of the compound. All temperatures herein stated are stated in degrees centigrade (° C.).

I claim:

1. A process, which comprises heating a compound selected from the group consisting of cis-chrysanthemamide and cis-chrysanthemonitrile, with an alkaline hydroxy compound in a liquid medium to produce a compound selected from the group consisting of trans-chrysanthemamide, and trans chrysanthemic acid.

2. A process, which comprises heating a compound selected from the group consisting of cis-chrysanthemamide and cis-chrysanthemonitrile, with an alkaline hydroxy compound at a temperature at least at the boiling point of the mixture to produce the corresponding trans-chrysanthemamide and discontinuing the heating prior to the formation of substantial amounts of trans-chrysanthemic acid.

3. A process, which comprises heating a compound selected from the group consisting of cis-chrysanthemamide and cis-chrysanthemonitrile, with an alkaline hydroxy compound at a temperature at least at the boiling point of the mixture to produce the corresponding trans-chrysanthemic acid.

4. A process, which comprises heating a compound selected from the group consisting of cis-chrysanthemamide and cis-chrysanthemonitrile in a 5 to 25% solution of alkali metal hydroxide at a temperature of about 75 to 100° C. to produce trans-chrysanthemamide.

5. A process, which comprises heating a compound selected from the group consisting of cis-chrysanthemamide and cis-chrysanthemonitrile in a 5 to 25% solution of alkali metal hydroxide at a temperature of about 100 to about 170° C. to produce trans-chrysanthemic acid.

6. A process, which comprises heating cis-chrysanthemamide with an alkali metal hydroxide in an alcohol at a temperature of about 75 to 100° C. to produce trans-chrysanthemamide.

7. A process, which comprises heating cis-chrysanthemamide with an alkali metal hydroxide in water at a temperature up to about 170° C. to produce transchrysanthemic acid.

8. A process, which comprises heating cis-chrysanthemonitrile with an alkali metal hydroxide solution in an alcohol at about 100 to 170° C. to produce trans-chrysanthemic acid.

9. A mixture of (d,l)-cis and trans chrysanthemonitrile having a B. P. of 105° C. at 16 mm. mercury and a refractive index of $n_D^{20}$ 1.4699.

10. A process, which comprises combining a solution in organic solvent of diazoacetonitrile said solvent having a boiling point of not over about 45° C., with 2:5-dimethylhexa-2:4-diene containing copper bronze at a temperature not substantially above the boiling point of said solvent to produce a mixture of (d,l)-cis and (d,l)-trans chrysanthemonitrile.

References Cited in the file of this patent

UNITED STATES PATENTS

| 2,452,012 | Flory | Oct. 19, 1948 |
| 2,603,652 | Schechter et al. | July 15, 1952 |

OTHER REFERENCES

Campbell et al.: Jour. Chem. Soc. (London), 1945, pgs. 283-6.

Degering: An Outline of Org. Nitrogen Compounds (1945), page 397.

Harper et al.: Chem. Abst., vol. 45, col. 7531 (1951).

Gilman: Organic Chemistry, vol. 1, 2nd ed. (1953), pg. 453.